US006734654B2

United States Patent
Henneberger

(10) Patent No.: US 6,734,654 B2
(45) Date of Patent: May 11, 2004

(54) METHOD OF REGULATING A GENERATOR, ESPECIALLY A CLAW POLE GENERATOR OF AN ON-BOARD VEHICLE ELECTRICAL SYSTEM

(75) Inventor: Gerhard Henneberger, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 10/029,524

(22) Filed: Dec. 21, 2001

(65) Prior Publication Data

US 2002/0079870 A1 Jun. 27, 2002

Related U.S. Application Data

(63) Continuation-in-part of application No. 09/582,333, filed on Jun. 23, 2000.

(30) Foreign Application Priority Data

Oct. 26, 1998 (DE) .......................................... 198 49 239

(51) Int. Cl.[7] .......................... H02H 7/06; H02P 11/00; H02P 9/00; H02P 9/10
(52) U.S. Cl. ............................ 322/89; 322/25; 322/28; 322/44; 322/59
(58) Field of Search .............................. 322/24, 26, 28, 322/25, 44, 59

(56) References Cited

U.S. PATENT DOCUMENTS

| | | | | |
|---|---|---|---|---|
| 3,996,507 A | * | 12/1976 | Chambers ................... 322/20 |
| 4,309,655 A | | 1/1982 | Lienhard et al. ............ 324/117 |
| 5,132,604 A | * | 7/1992 | Shimane et al. .............. 322/10 |
| 5,374,886 A | * | 12/1994 | Kohl et al. .................... 322/28 |
| 5,635,804 A | * | 6/1997 | Tanaka et al. .............. 318/139 |
| 5,648,705 A | * | 7/1997 | Sitar et al. .................. 318/145 |
| 5,663,631 A | * | 9/1997 | Kajiura et al. ................ 322/29 |
| 5,719,487 A | * | 2/1998 | Sato et al. .................... 322/28 |
| 5,942,818 A | * | 8/1999 | Satoh et al. .................. 310/46 |
| 6,252,381 B1 | * | 6/2001 | Schenk ........................ 322/28 |
| 6,351,104 B1 | * | 2/2002 | Koelle et al. ................. 322/22 |

* cited by examiner

Primary Examiner—Burton S. Mullins
Assistant Examiner—Julio C. Gonzalez
(74) Attorney, Agent, or Firm—Michael J. Striker

(57) ABSTRACT

The method for regulating a generator including three stator windings (U, V, W) and a converter bridge (11) including controllable switch elements (15 to 20) includes temporarily connecting the stator windings (U, V, W) in an otherwise currentless time interval with a charge source (21) that supplies an additional charging current to the stator windings (U, V, W) in addition to induced current present in the stator windings (U, V, W). The additional charging current provides the generator (10) with additional magnetic energy. In a preferred embodiment of the method, the supply of additional charging current to the stator windings is controlled by a logistics element (27) for setting a turn-on time and a longest on-time duration of at least one switch element and a comparator (25) that produces a comparison output according to a comparing of an actual current value with a predetermined maximum value.

9 Claims, 2 Drawing Sheets

METHOD OF REGULATING A GENERATOR, ESPECIALLY A CLAW POLE GENERATOR OF AN ON-BOARD VEHICLE ELECTRICAL SYSTEM

CROSS-REFERENCE

This is a continuation-in-part of pending application Ser. No. 09/582,333, filed Jun. 23, 2000.

BACKGROUND OF THE INVENTION

1. Field of the Invention

The present invention relates to a method for regulating a generator and, more particularly, to a method of regulating a claw pole generator driven by an internal combustion engine, which is associated with a converter bridge with triggerable switch elements controlled by a regulating device.

2. Description of the Related Art

Claw pole generators are used in motor vehicles to furnish the electrical energy for the on-board vehicle electrical system. These rotary current generators are connected to the direct voltage system of the vehicle via a diode rectifier bridge. The generator outputs power as soon as its induced voltage exceeds the system voltage. The power output of the generator is regulated via the intensity of the exciter current. The system voltage or the output voltage of the generator is typically used as the controlled variable.

To reduce fuel consumption in recent motor vehicles, the idling rpm of the engine is kept as low as possible. A low engine rpm also affects the generator rpm, since the generator is driven by the engine. To allow the generator to output enough electrical energy to the on-board electrical system even during engine idling and to enable recharging of the battery, the generator is required to furnish energy, even at low generator rpm levels. Furthermore, at typical rpm levels the generator should output as much energy as possible. Optimal generator regulation should therefore, on the one hand, make a general power increase possible and, on the other, make it possible to lower the startup rpm, that is, to lower the rpm level above which the rpm can output power.

A rotary current generator for a motor vehicle that outputs improved outset power compared with conventional generators is known from European Patent Disclosure EP 0 762 596 A1. Instead of a conventional rectifier bridge, this rotary current generator has a full-wave-controlled rectifier bridge that includes six controlled switches. By suitable triggering of the switches of the bridge, which for instance include switchable semiconductor elements, phase regulation can be performed in which the phase voltages of the generator are shifted relative to the phase currents. As a consequence, additional currents flow into the stator windings and lead to an increase in the starting power of the rotary current generator compared to a rotary current generator with only a simple diode bridge.

SUMMARY OF THE INVENTION

It is an object of the present invention to provide an improved method of regulating a generator, especially a claw pole generator driven by an internal combustion engine.

According to the invention the method for controlling or regulating a generator, said generator having three stator windings and respective generator terminals associated with the windings, a converter bridge including controllable switch elements and means for controlling the switch elements, includes temporarily connecting the stator windings for a predetermined time interval with a charge source that supplies a charging current to the stator windings in addition to induced current present in the stator windings, which charges a generator inductance with magnetic energy from the charge source. The charge source is either a battery or a capacitor.

The method of the invention for regulating a generator has the advantage that the generator furnishes a higher starting power, and that in particular at low rpm it furnishes a higher starting power. It is especially advantageous that the so-called startup rpm of the generator, that is, the rpm above which it is at all possible to output power, is lowered compared with conventional generators.

The method of the invention can be employed to obtain the above objectives and advantages, since a converter bridge with switch elements instead of conventional diodes is associated with the generator. By the correct triggering of these switch elements, it is possible to connect the generator terminals to the positive or negative pole of the battery independently of the natural ignition times of a diode bridge. By suitable triggering of the switch elements, additional currents are supplied to the generator terminals, and the output power of the generator can be increased. These additional currents are initially drawn from the battery, or optionally from an intermediate circuit capacitor, and delivered to the generator via the switch elements. The feeding times into the generator phases are advantageously selected so that they are located in intervals in which the phase current in diode operation is low or disappears (ripples). The power increase of the generator because of the direct current pulsation is associated with an increased waviness of the output current. This waviness is composed of the generator output current and the withdrawal of the current pulses. Advantageously, however, smoothing can again be attained with the aid of an additional capacitor.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
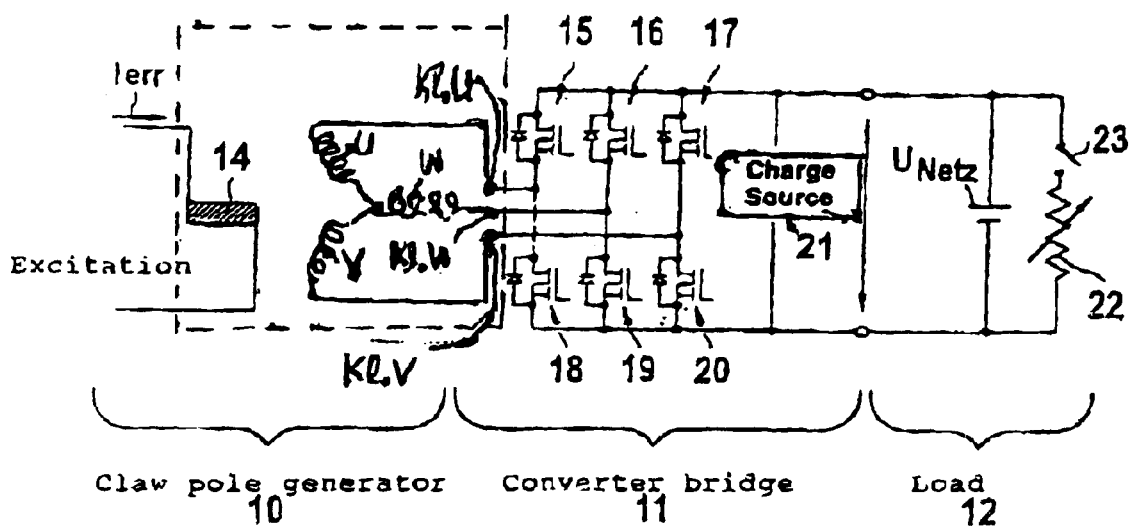
FIGS. 1 and 2 together are schematic diagrams of parts of a circuit arrangement for performing a first embodiment of the inventive method.

The essential components of a generator 10, i.e. a claw pole generator, with a converter bridge 11 and the load 12 are shown in FIG. 1. The claw pole generator 10 includes the three stator windings U, V, W and an exciter winding 14. The exciter current Ierr is shown symbolically in FIG. 1. The converter bridge 11 includes the switch elements 15 to 20, which are connected to the stator windings U, V, W of the claw pole generator 10 in the usual way, as in a diode bridge. The switch elements 15 to 20 are connected to a charge source 21, across which the system voltage $U_{Netz}$ that is applied to the load 12 can be picked up. The charge source 21 can be a battery, for example the on-board battery of the electrical system, or a capacitor. All that is shown of the load 12 is a variable resistor 22 and a switch 23, in each case symbolically.

With the circuit arrangement shown in FIG. 1, the method of the invention for regulating the generator can be performed. By suitable triggering of the switch elements 15–20, additional currents are supplied to the generator terminals KI.U, KI.V, KI.W. The switch elements 15–20 act as current valves and will hereinafter also be called valves. In detail, during an otherwise currentless time interval, an additional current pulse is supplied. These current pulses lead to charging of the generator inductance with magnetic energy. By feeding in direct current pulses, the generator is additionally supplied with inductive wattless power, which is equivalent to an additional magnetizing current.

The power output of the generator 10 can be increased compared with pure diode operation, by offering an additional magnetizing current to the stator windings. The phase during which the switch elements 15–20 of the converter bridge 11 are conductive is then shifted as a whole. A phase shift between the generator voltage and the generator current occurs. The machine then takes up wattless power. This means that as soon as the phase current in one of the stator windings has a zero crossover and commutation would occur in diode operation, the commutation is delayed by appropriate triggering of the switch element or switch elements. The thus-closed switch element assures a further connection to the battery. The turn-on time and the longest on-time duration of a switch element or switch are defined or set by a logistics element for the valve release. This time corresponds to the otherwise currentless time range of one phase.

For the power output of the generator, regulating the turn-off time, that is, the commutation point, is of significance. This shift between current and voltage can be regulated by various methods. Some of these methods that offer especially simple possibilities of regulation are shown in the exemplary embodiments in FIGS. 2–4. The regulation described below is embodied such that the switch elements are triggered only in the so-called ripple phases of the current and are turned off as soon as the measured current exceeds an allowable value.

The regulation of the level of the output voltage of the generator is done in the usual way by means of a voltage regulator, which for instance is a component of the claw pole generator 10 in FIG. 1 and which regulates the exciter current in such a way that a predetermined voltage level results. The voltage regulator is not shown in the drawing.

1. Regulation of the Switch Currents

Figure 2:
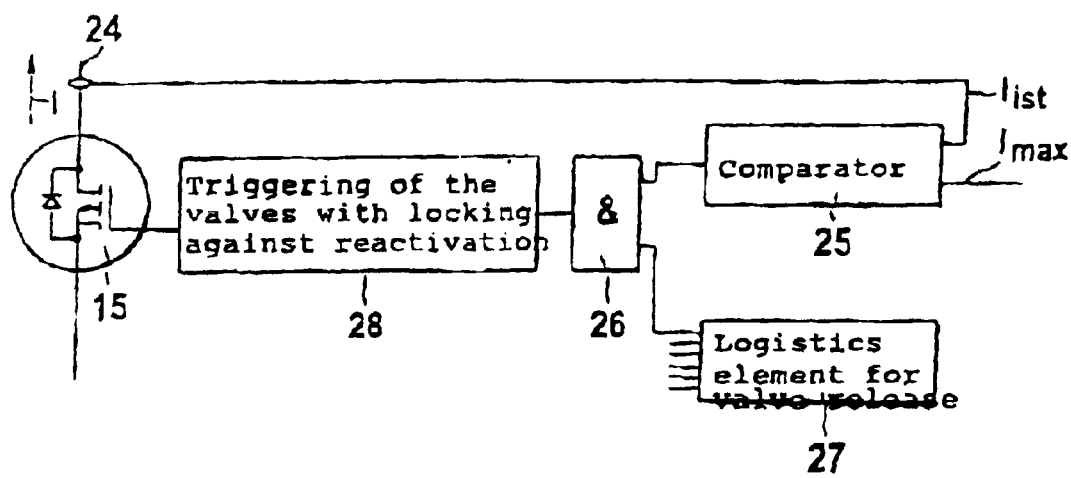
Figure 3:
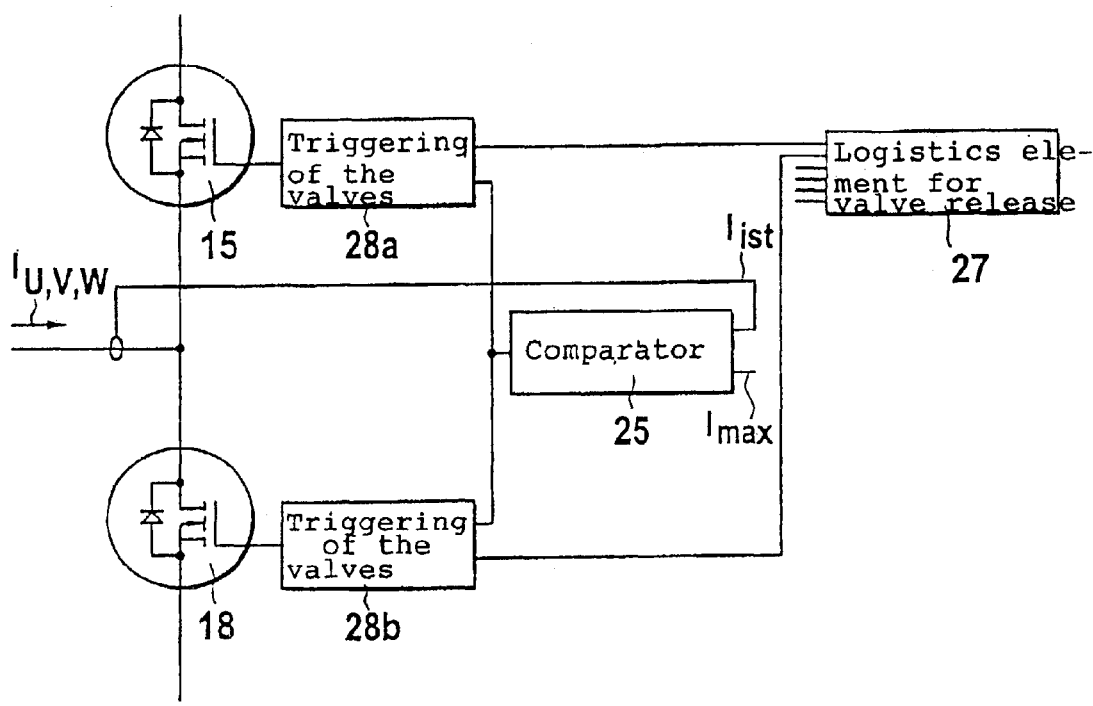
FIGS. 3 and 4 are schematic diagrams of alternative circuit arrangements similar to FIG. 2 for performing alternative embodiments of the method of the invention.

FIG. 2 shows a regulating circuit for a switch or switch element (valve) with which the regulation of the switch currents can be explained. For this regulation, the currents through the switch elements are detected and used for the regulation. For example, the current I through the switch element 15 is detected with the aid of a suitable current detector (measuring instrument) 24 and is delivered as an actual current value list to a comparator 25. This comparator 25 is additionally furnished with a maximum value for the current Imax. The regulating circuit of FIG. 2 further includes an AND gate 26 and a logistics element for the valve release 27, and the AND gate 26 links the outputs of the comparator 25 and of the logistics element for the valve release 27 to one another. A triggering for the valves with locking to prevent re-activation 28 triggers the valve 15, for instance, as a function of the output of the AND gate 26.

With the regulating circuit shown in FIG. 2, the higher-ranking voltage regulation or power regulation of the generator is performed; a maximum value for the switch currents is released. If the actual current of the applicable switch exceeds this predetermined value, the valve is turned off. The current commutates in the complementary diode of the bridge branch.

For proper operation, locking of the shut-off valve is necessary. Since immediately after the shutoff of the valve the valve current becomes zero the pure current comparison will lead to renewed through-switching of the valve. This function is realized by the logic circuit shown in FIG. 2.

2. Regulation of the Phase Currents

Since the maximum value of the direct current is identical to the maximum value of the phase currents, a further possible way of regulating the generator output is to switch the switches as a function of the phase currents. To that end, instead of the switch currents, the currents through the phase windings U, V and W of the generator 10 are measured and delivered to the regulation. One example for such a regulating circuit is shown in FIG. 2.

Since in this regulation the two switches, such as 15 and 18, of one converter branch always regulate one phase, their triggering is also expediently combined during regulation. The devices for triggering of the valves are indicated by 28a and 28b in FIG. 3. The turn-off of the switched-through valve is reached as soon as the associated phase current has exceeded a predetermined maximum value.

3. Regulation of the Direct Current

Figure 4:
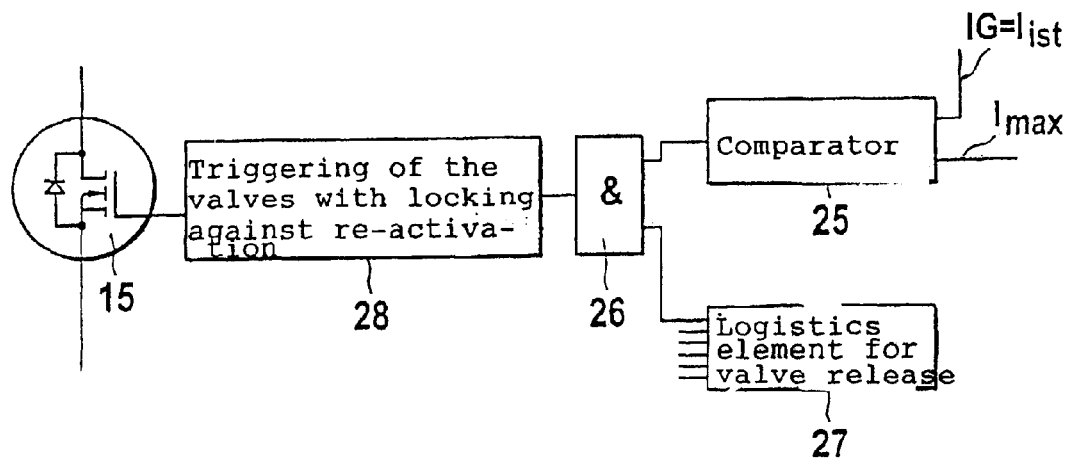

In FIG. 4, a further regulating circuit for a switch element or valve is shown, with which regulating the direct current IG can be performed. If the direct current, that is, the output current of the generator, is used for regulation purposes, then it is necessary only to measure a value that is supplied to the comparator and compared with a set-point value. The regulating circuit shown in FIG. 4 corresponds to the circuit of FIG. 2, but the regulation is based not on the valve current I but rather on the direct current IG of the generator.

A combined regulation via the direct current and the switch currents can also be achieved. To reduce the number of current measurements, the valve currents can also be derived from the measured current.

While the invention has been illustrated and described as embodied in a method for regulating a generator, especially a method of regulating a claw pole generator driven by an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method for controlling or regulating a generator, said generator (10) comprising three stator windings (U, V, W) and three generator terminals (KI.U, KI.V, KI.W) connected with the three stator windings respectively, and wherein said generator terminals are connected with a converter bridge (11) for producing a direct current (IG), said converter bridge including controllable switch elements (15 to 20), and means for controlling said switch elements are provided; said method comprising the steps of:

a) measuring a current of said generator or said converter bridge with a current detector (24) to obtain a measured current value; and b) controlling said switch elements (15 to 20) of the converter bridge (11) according to said measured current value, said controlling comprising temporarily connecting at least one of said stator windings to a charge source (21), said charge source (21) being a battery or capacitor, independently of natural turn-on or ignition times of said switch elements, in order to supply said at least one of said stator windings with an additional charging current in addition to any induced current present in said stator windings during an otherwise currentless time interval, so that said generator is supplied with additional magnetizing current.

2. The method as defined in claim 1, wherein said additional charging current comprises a plurality of current pulses and times of feeding said current pulses into said stator windings (U, V, W) are selected so that an applied phase current is a predetermined minimum value.

3. The method as defined in claim 1, wherein said means for controlling said switch elements (15 to 20) comprises a logistics element (27) for setting a turn-on time and a longest on-time duration of at least one of said switch elements.

4. The method as defined in claim 1, wherein said means for controlling said switch elements comprises a comparator (25) and wherein said controlling comprises comparing, with said comparator (25), said measured current value with a respective predetermined maximum current value to produce a comparison output.

5. The method as defined in claim 4, wherein the measured current value is obtained by measuring a switch current passing through one of said switch elements (15 to 20) by means of said current detector (24).

6. The method as defined in claim 4, wherein the measured current value is obtained by measuring a stator winding current by means of said current detector (24).

7. The method as defined in claim 4, wherein the measured current value is obtained by measuring said direct current output by said converter bridge with said current detector (24).

8. The method as defined in claim 7, wherein said direct current and a winding current of the stator windings are both measured to obtain two actual current values and said controlling is performed according to said two actual current values.

9. The method as defined in claim 1, wherein the generator (10) is provided with an exciter winding (14) and further comprising regulating an output voltage of said generator by controlling an excitation current ($I_{err}$) passing through said exciter winding (14).

* * * * *